Dec. 13, 1966 G. T. TRACY ETAL 3,291,343
DISPENSER UNIT
Filed Jan. 14, 1965 3 Sheets-Sheet 1
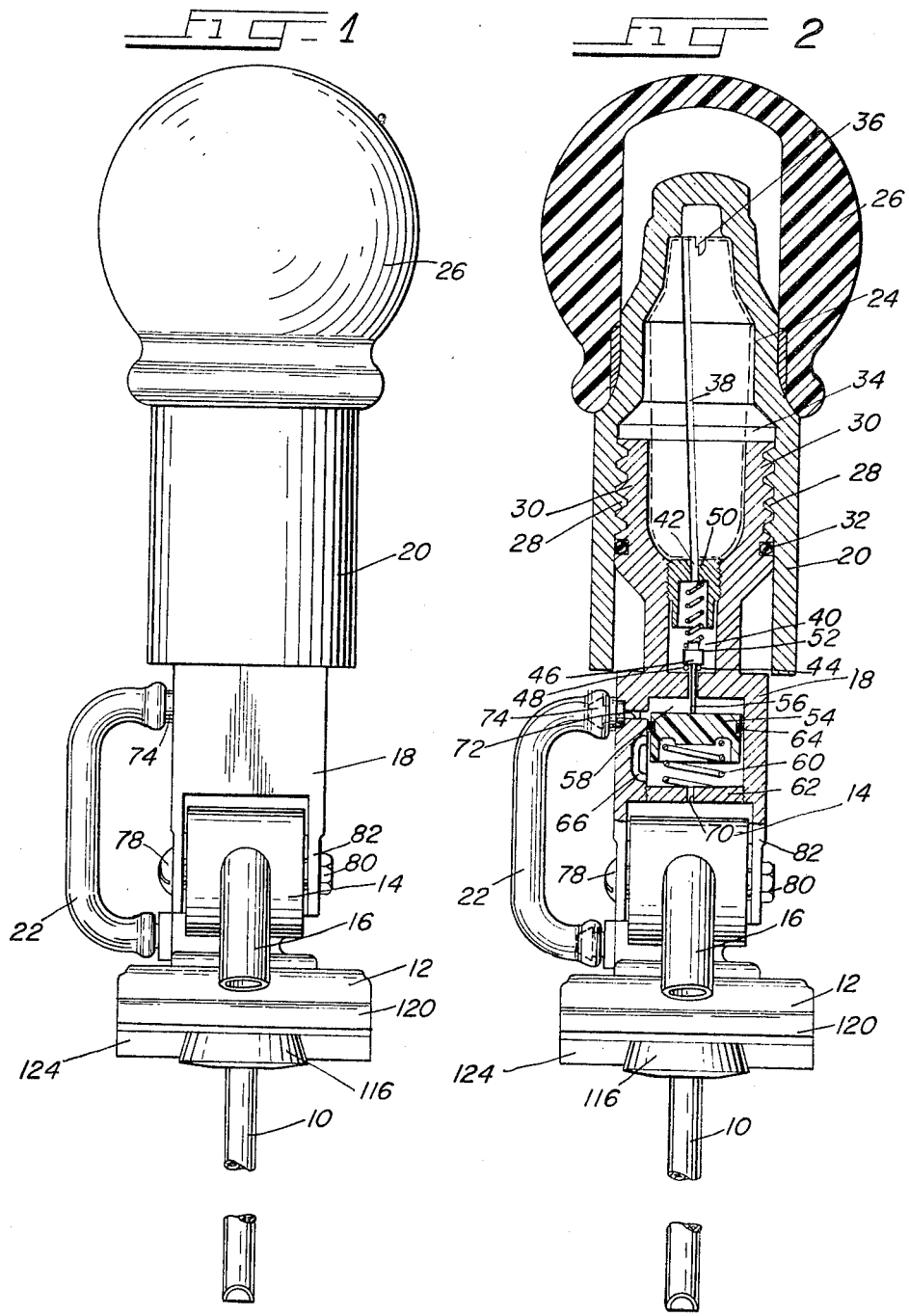
INVENTORS
GERALD T. TRACY
RICHARD D. ZENGER
BY
James T. FitzGibbon
ATTY

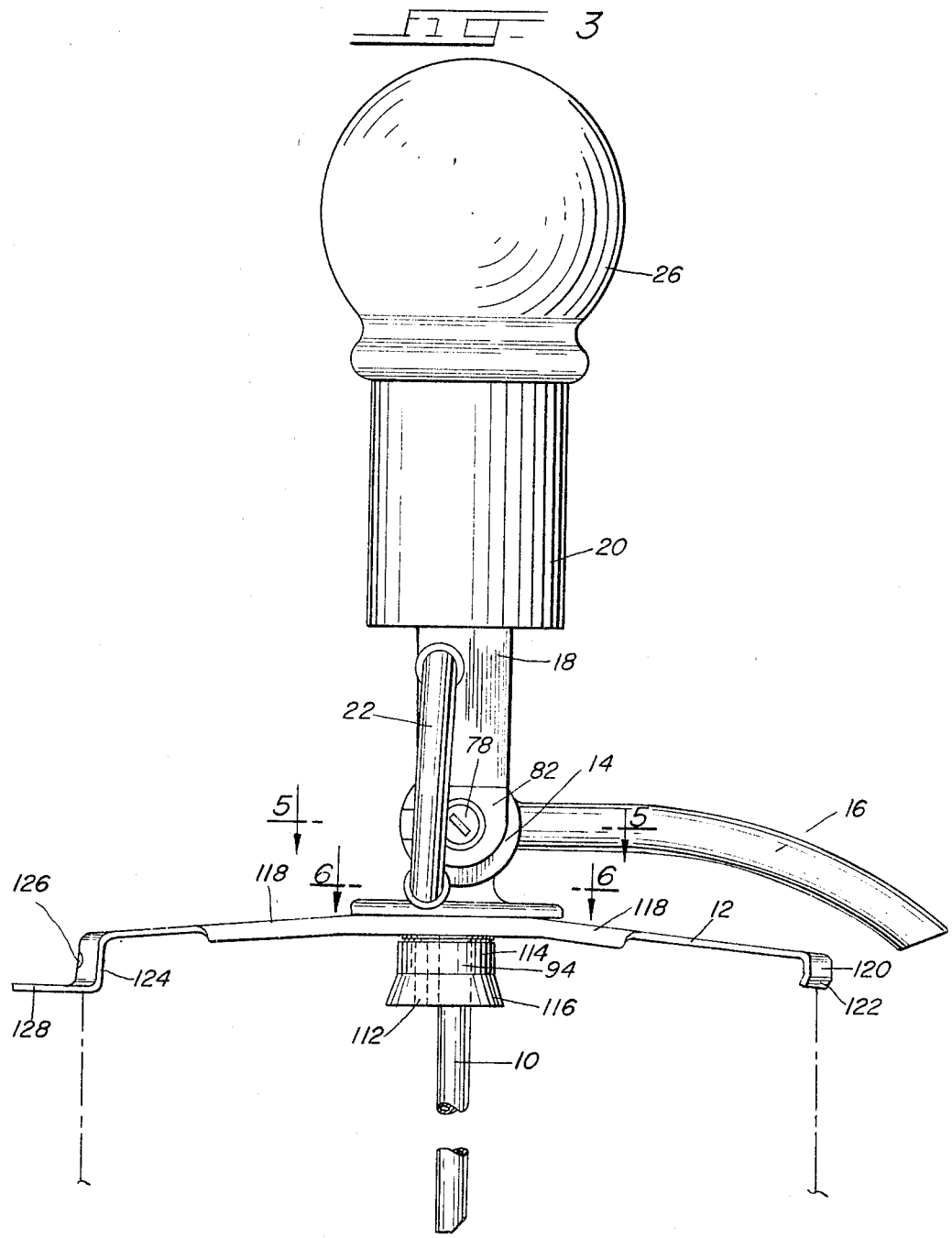

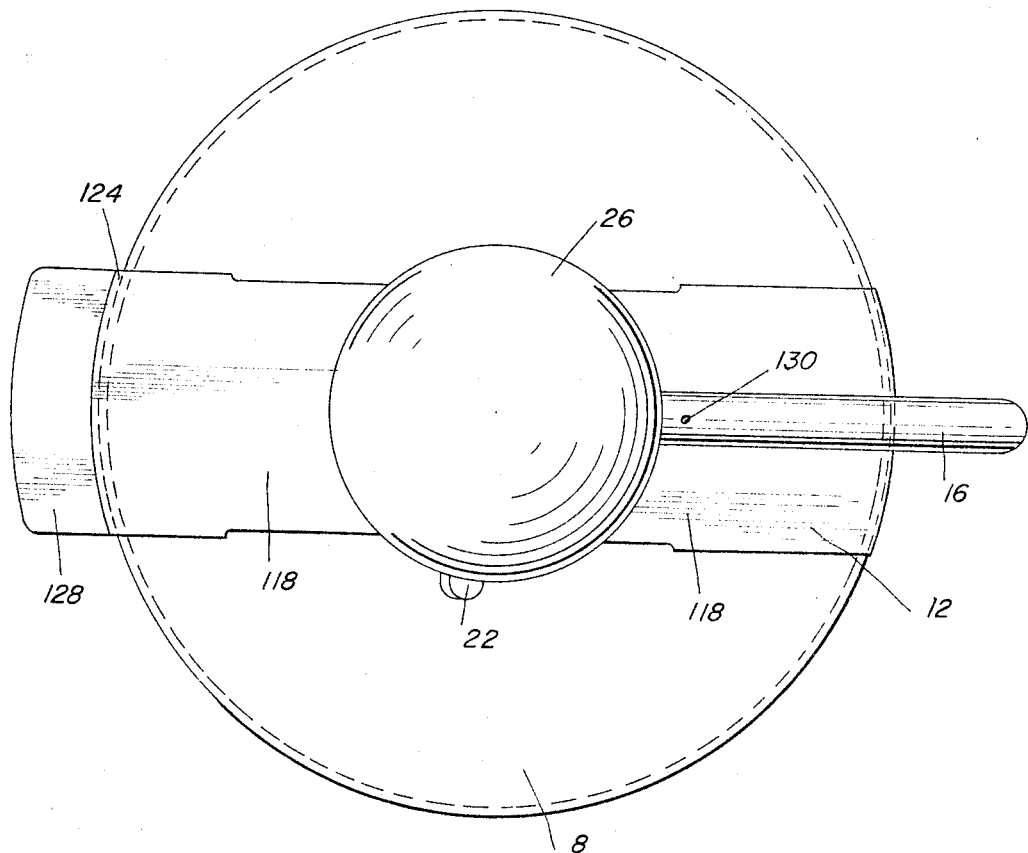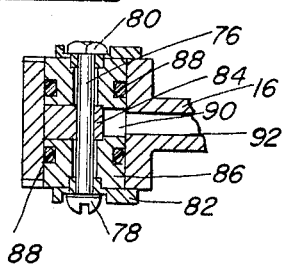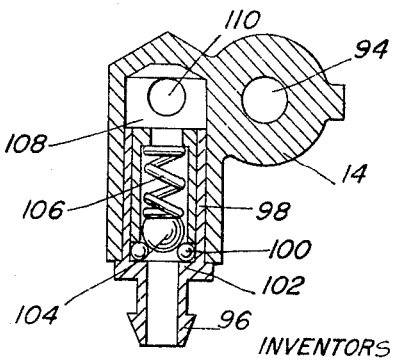

United States Patent Office 3,291,343
Patented Dec. 13, 1966

3,291,343
DISPENSER UNIT
Gerald T. Tracy, Clarendon Hills, and Richard D. Zenger, Lisle, Ill., assignors to National Can Corporation, Chicago, Ill., a corporation of Delaware
Filed Jan. 14, 1965, Ser. No. 425,452
7 Claims. (Cl. 222—52)

The present invention relates to a dispenser unit, and more particularly to a combination pressurizing and dispensing unit for liquids, adapted to be removably received over the top seam of a metal container. One particular use for the combination pressurizing and dispensing unit of the present invention is in dispensing beer or other malt beverages from metal containers.

As is well known in the beer and beverage industry, metal containers have a number of advantages when used for beer or ale, such advantages including, but not being limited to, light-tightness, pressure retention, strength, and freedom from substantial danger of breakage while being subject to the rough handling normally incident to transportation and sale. Accordingly, most so-called draft or tap beer, that is, unpasteurized beer, is generally sold in heavy and expensive metal kegs of a capacity of approximately four gallons up to 32 gallons, and such kegs require a cash deposit by purchasers to insure their return to the sellers thereof.

In addition, large quantities of beer are sold in smaller metal disposable containers, namely, so-called tin cans of 11 oz., 12 oz., 15 oz., and 16 oz. capacities. By far the great majority of the beer sold in these relatively smaller containers is pasteurized beer, which, from the standpoint of freshness and flavor, is generally considered to be somewhat less desirable and flavorful than unpasteurized or so-called draft or tap beer, although pasteurized beer has other advantages which make it desirable. Accordingly, in view of the more desirable flavor of draft beer, and the desirable handling advantages, including disposability, of smaller conventional tin cans, there has been a long felt need in the industry for combining the advantages of draft beer flavor and the advantages of tin can convenience. For example, a tin can may be made light enough to be transported readily, and may nonetheless be inexpensive enough to manufacture so that it may be thrown away after use and thus not present the commercial disadvantages of greater expense and requirement of being returned, which characterizes metal kegs.

Although it has been considered desirable to combine these advantages, up until the present time there has been no suitable dispenser unit available. In addition, because of the lack of a dispenser unit, or system, beer has not generally been marketed in this country by most brewers in intermediate size containers. Recently, however, beer has nevertheless become available in one gallon and smaller size containers which are very similar to, and are in fact, large scale versions of the ordinary so-called tin can of wide spread commercial use, but such cans, when filled with beer and like beverages, have heretofore been marketed only with air-operated dispensers, which are undesirable for reasons well known to those in the brewer's art. Carbon dioxide operated dispensing devices have been suggested in the prior art, but those devices which have been heretofore known have been impractical in use, because such units were either unduly expensive, or unable to make use of suitable carbon dioxide containers, or were unduly delicate and/or cumbersome.

It is well known in the art that beer, if kept free from contamination with air borne bacteria, and if kept in the dark and at low enough temperatures to keep yeast and other organisms in an inactive state, can be stored under a desired carbon dioxide pressure and thus be safely preserved for an indefinite length of time, for example several weeks or more.

Accordingly, it is an object of the present invention to provide a simple and effective beer dispenser which is useful with and removable from a throw away style container. It is a further object of the present invention to provide such a pressure regulating and beer dispensing device which will be sturdy and rugged, and yet inexpensive.

It is another object of the present invention to provide a carbon dioxide pressure regulating and beer dispensing unit or device which may be attached in use to the top of a can and secured thereover by a snapping action resulting from the inate resiliency of a clamp member associated therewith.

A further object of the present invention is to provide a dispensing unit which includes a handle for controlling the flow of liquid out of the can, and which further includes a compact piston type regulator and gas cartridge accommodating means disposed in the handle thereof.

Another object of the present invention is to provide a combination can pressurizing and beer dispensing device which will use small gas cartridges which are readily commercially available on the market.

Another object of the present invention is to provide a beer dispenser which includes an inexpensive but simple and effective gas pressure regulator.

An additional object of the present invention is to provide a dispenser unit in which a regulator is closely associated with the dispenser, but wherein the regulator mechanism is effectively protected from contact with beer and beer foam.

These and other objects of the present invention, including those hereinbefore pointed out, and others which are inherent in the invention, will become more apparent when considered in conjunction with a description of the preferred embodiments of the invention, and as defined in the appended claims, and as shown in the drawings in which:

FIG. 1 is a front elevational view of the dispenser unit of the present invention;

FIG. 2 is a front elevational view of the dispenser unit of the present invention similar to that shown in FIG. 1, but with the upper portion thereof being shown in vertical section, such section being taken along lines 2—2 of FIG. 3;

FIG. 3 is a side elevational view of the dispenser unit of the present invention;

FIG. 4 is a top plan view of the dispenser unit of FIGS. 1 and 3;

FIG. 5 is a horizontal section view of a portion of the dispenser taken along lines 5—5 of FIG. 3;

FIG. 6 is a greatly enlarged horizontal section view of a portion of the dispenser taken along lines 6—6 of FIG. 3.

Referring now to the drawings in greater detail, a dispenser unit for a can 8 is shown, as for example in FIG. 1, to comprise a number of principle elements, namely, a dip tube 10, a clamp unit 12, a check valve and fluid passage body 14, a so-called "dripless" dispensing spout element 16, a handle body 18, and a handle cover unit 20, the check valve and fluid passage body 14 being connected to the handle body 18 by means of a flexible gas tube 22.

It will be seen that the handle cover 20 is adapted to partially contain a gas cartridge 24 (broken lines) which may be held between the cover 20 and the handle body 18 by rotating the handle cover 20 or the outer grip 26 so that the screw threads 28 on the cover 20 engage the threads 30 on the handle body 18. An O-ring seal 32 is provided to keep the cartridge housing 34 in a gas-tight condition. A steel piercing pin 36 is mounted in the tube portion of the handle cover 20 to pierce the cartridge 24 to allow gas to escape therefrom, to traverse the passage 38 in the housing 34, and enter a high pressure chamber 40 in the handle body 18 after passing through the orifice.

The walls of a portion of the handle body define a high pressure chamber 40 which contains, at the bottom thereof, a valve accommodating passage 44, and flow therethrough is controlled by a valve unit 46. This valve 46, which includes a sealing ring 48 on the lower shoulder thereof, is located in place by a smaller valve spring 50 engaging the top shoulder 52 of the valve 46, and is held in place at the bottom by a valve piston 54 to which the valve stem 56 is centrally attached. The piston 54 and the valve stem 56 are shown as integrally formed, but attachment of these parts to each other may be by any suitable means.

Other portions of the handle body 18 and the valve piston 54 will be seen to define a low pressure chamber 58 of variable volume. The piston 54 is located in the body 18 and is kept in the desired position by means of the larger valve spring 60, such valve spring 60 being seated against the spring base 62. Gas tightness of the chamber 58 is maintained by the O-ring 64 and the piston 54, and a safety bleed or release passage 66 is provided to allow passage of gas from the low pressure chamber through the safety opening 70 in the spring base 62. A low pressure outlet opening 72 and a hose grommet 74 are provided to conduct the gas through the hose or tube 22. The operation and capabilities of this regulator unit will be described hereinafter.

Referring now to another principal element of the dispenser unit, the check valve and fluid passage body 14 is shown generally in FIGS. 1 and 3 and two sectional views thereof are shown in FIGS. 5 and 6 respectively. As will be seen by reference to FIG. 5 for example, a central shaft 76 terminating in a screw head 78 in one end and lock nut 80 on the other serves as a pivot point for the lower extensions 82 of the handle body 18. The central shaft 76 is attached, as by a key 84 (FIG. 5) to the fluid valve core 86. This core 86 is rendered fluid tight by the incorporation of sealing rings 88, and provides a fluid passage 90 which is adapted to register, in suitable position, with the interior passage 92 of the dispensing spout 16. Thus, movement of the handle body 18 and the lower extensions 82 thereof to a relatively forward and down position about the pivot axis defined by the central shaft 76 will register the port 90 with dispensing spout 16, allowing liquid to flow up the dip tube 10 through the fluid passage body 14, provided there is a top or head space pressure on the liquid in the container.

FIG. 6 shows a fluid passage 94 in the passage body 14 for connecting the dip tube 10 with the port 90.

The other principal element of the check valve and fluid passage body 14 is the check valves and gas passage system, and this system is best shown in FIG. 6. A hose grommet 96 is shown in FIG. 6 to be provided for accommodating a gas tube 22 (FIGS. 1 and 2) on one end thereof, and the inwardly extending cylindrical portion 98 of this grommet 96 surrounds a valve assembly comprising an O-ring seal 100 which is seated on the inner shoulder 102 of the grommet 96. A ball 104 is retained against the O-ring seal 100 under pressure of the spring 106 acting against a spring base 108. Spring base 108 includes a gas passage 110 for directing the carbon dioxide through the lower gas passage 112 (FIG. 3) and thence into the head space above the liquid inside the container.

It will thus be seen that the check valve assembly will allow passage of gas into the beer but resists upward passage of liquid beer or foam through the gas tube, and this system prevents contact between regulator assembly and any liquid or foam. The tension on the valve spring 106 is very slight, say of an order sufficient to provide opening pressure of about 2 to 10 p.s.i. on the valve.

The lower portion of the check valve and fluid passage body 14 is disposed under the clamp element 12 and this portion comprises an upper, rigid passage body 114, and a lower rubber or rubberlike seal element 116. In use, the dispenser unit of the present invention is clamped onto a one gallon, half-gallon, or similar size container with a single central opening therein, such opening usually being in the order of about 5/8 of one inch in diameter. The dip tube 10 fits through the opening, and the seal is maintained by the pressure between the top of the can and the downward force of the upper rigid passage body 114, and the flexible seal unit 116 held therebetween. Thus, the gas proceeds down the lower gas passage 112 into the head space or non-liquid filled portion of the container, and the beer or other liquid proceeds from a point near the bottom of the container up the dip tube 10 and through the upper element 114 and thence through the passage body 14 and out the spout element 16. The spout element 16 may be rendered "dripless" by the provision of an air hole 130 (FIG. 4) near the upper end thereof, so that no liquid will be retained in the spout 16.

FIGS. 3 and 4 best illustrate the clamp unit 12. This clamp unit 12 includes a principle, central section 118 which terminates in the front end thereof in a downwardly depending flange 120, such flange 120 also having a lowermost slightly inwardly extending gripping face 122, the flange and the face 120, 122 combining to grip the upper outer edge or so-called double seam of a large tin can of the type referred to herein. The clamp 12 also includes a downwardly depending rear flange 124 with an inwardly extending dimple 126 or like projection thereon adapted to grip the double seam of the container. At the lowermost portion of the flange 124 is a rearwardly extending flange element 128 which can be grasped between fingers of the user in order to release the clamp unit 12 from the container.

In use, the clamp 12 is affixed to the container by inserting the dip tube 10 of the dispenser into the central opening of the container, lowering the dispenser until the seal member 116 contacts the top of the can. Thereupon, the front flange 120 is engaged over the double seam and a downward pressure is placed on the rear portion of the clamp 12, whereupon the dimple 126 snaps over the double seam and holds the dispenser in place. The clamp 12 is constructed from a resilient material, such as a spring steel. Release of the clamp 12 from the can is affected by pushing down on the rearward portion of the clamp 12, to bend the dimple 126 somewhat outwardly, and lifting up on the rearwardly extending flange 128.

In the use of the device, a gas cartridge 24 of the type which is available commercially from a number of manufacturers, and which normally contains a charge of about eight grams of carbon dioxide is placed between the handle body 18 and the handle cover 20, and threads 28, 30 are engaged as the cover is screwed down to form a tight seal and cause the steel pin 36 to pierce the end of the cartridge 24. Thereupon, the gas which is released from the cylinder 24 exits through the orifice 42 and then is allowed to enter the chamber 40.

In the initial or uncharged state, the regulator is biased by the larger valve spring 60 into a position where the valve passage 44 is open, and valve unit 46 is not seated. As back pressure is built up in the head space, and consequently in the tube 22 and the low pressure chamber 58, the valve piston 54 moves downwardly and pulls the valve unit 46 downwardly so that the sealing ring 48 creates a gas-tight seal between the body 18 and the valve 46, thereby leaving the high pressure region confined to the chamber 40 and the low pressure region confined to the chamber 58 and to the head space thereunder. As the pressure diminishes, the larger valve spring 60 will cause the piston to move upwardly and open the valve unit 46 from time to time as conditions dictate. Thus, the regulator is completely automatic in operation.

The provision for the bleed passage 66 allows excessive pressure, if any is present, to be bled therethrough when the valve piston 54 moves to a very low position. When the passage 66 is uncovered, the gas may then pass out the safety opening 70 in the spring base 62. It will thus be seen, that in case of an excessive pressure, the undesired high pressure will be bled off, but only during a time when the bleed passage 66 is uncovered, and thus the regulator will return to its normal condition without anything further being required, and without entirely bleeding the system, but merely lowering the pressure to the desired pressure.

In use, the eight gram cartridge will provide an initial outlet pressure of between 900 and 2,000 p.s.i. and the pressure in the chamber 40 may range from 0 up to 2,000 p.s.i.

The pressure in the lower chamber normally desired to be about 15 p.s.i. (gauge). The bleed or bypass opening 66 is normally uncovered at a pressure of about 25 p.s.i. Screwing the spring base 62 inwardly or outwardly changes the pressure setting of the regulator, which as will be seen from the above description, is best characterized as, and sometimes further herein referred to as an unbalanced valve, piston operated regulator.

The materials preferred for use in the present invention are as referred to below. The handle body 18 and cover 20 may be made of polypropylene for pressures up to about 1,000 p.s.i., and are preferably made from aluminum or an acetal plastic (Delrin) if higher pressures are contemplated. The outer grip 26 is principally decorative and made from a suitable plastic such as a styrene or an acrylic plastic. The valve unit 46 and the springs 50, 60 are made from stainless steel, the valve piston may be made of polypropylene. The hose 22 may be made from neoprene, and the grommets 74, 96 are made from steel. The seals, in the form of "O" rings and otherwise, may be made from rubber, polytetrafluoroethylene (teflon) or like $CO_2$ resistant material. The check valve and fluid passage body 14, and spout 16 are preferably made from polypropylene, and the clamp 12 is made from stainless steel, the dip tube 10 is likewise made of stainless steel and the sealing ring 116 is made from synthetic rubber.

It has been found that a dispenser constructed according to the present invention is suitable for keeping beer in substantially its natural or brewery fresh state for a period of several weeks or more, a satisfactory equilibrium being obtained between the dissolved $CO_2$ in the beer and the carbon dioxide supplied from the cartridge, for example and about 38° F. and 15 p.s.i. (gauge).

One of the principal novel features of the present invention is the inexpensive, unbalanced valve, piston operated type regulator. It has been heretofore known to use diaphragm regulators in dispenser units, but such regulators are generally not satisfactory inasmuch as their cost is excessive, they are unduly delicate, they must be made quite large to be accurate, and there is no simple and practical system available for non-destructively releasing an undesirable overpressure present in the low pressure side of the system. However, the piston type regulator of the present invention provides a number of desirable advantages in operation, and in addition, is simple, dependable, and inexpensively incorporates an overpressure release system which can operate repeatedly without harmful effects on other parts of the system.

The invention has been particularly described herein with reference to beer and carbon dioxide, although it is understood that this invention is suitable for use with soft drinks or carbonated beverages, as well as with so-called single strength juice. Thus, in the case of soft drinks $CO_2$ may be used at somewhat higher pressures by an appropriate setting of the regulator, such pressures generally characterizing soft drinks or carbonated water, and a relatively insoluble gas such as air or nitrogen may be used in the event that gas is desired merely for purposes of acting as a propellant or for carbonating the beverages or retaining them in a state of carbonation.

Another novel feature of the present invention is that, by reason of the check valve ball 104 being seated on the ring 100 during normal conditions, the dispenser unit may be placed on its side rather than in the upright position of FIG. 3, and it will operate in this position to dispense beer satisfactorily, provided that a dip tube 10 is curved downward to reach the bottom of the container. Thus, if the container is placed upright, the tube would extend vertically to the bottom, whereas if the can were to be laid on the side thereof, the dip tube 10 would bend downwardly so as to reach the bottom of the can with respect to that position of use.

It will thus be seen, from the above description, taken in conjunction with the appended claims and drawings, that the present invention provides a new and improved combination pressure regulator and fluid dispensing system having desirable advantages and characteristics including those hereinbefore pointed out and others which are inherent in the invention.

I am aware that certain modifications and changes will be apparent to those skilled in the art, and I contemplate that such changes may be made without departing from the spirit of the invention or the scope of the appended claims.

I claim:
1. A carbonated beverage dispenser unit comprising, in combination,
   (a) spout and valve body means for dispensing a liquid,
   (b) valve means movably disposed in said valve body and in communication with said spout for controlling the flow of said liquid,
   (c) handle means attached to said valve means whereby pivotal movement of said handle means actuates said valve means and controls the flow of liquid through said valve means and said spout means,
   (d) gas cartridge receiving means in said handle for accommodating a gas cartridge therein,
   (e) a piston-operated regulator in said handle means for regulating the pressure of the gas from said cartridge on the contents of a container attached to said dispenser unit, and
   (f) clamp means for attaching said dispenser unit to a liquid container.

2. A combination container pressurizing and liquid dispensing device, comprising, in combination
   (a) a valve body and spout unit including a gas passage, a liquid passage, and, communicating with said liquid passage, a liquid dispensing spout member, said unit being adapted to cover an opening in a liquid-containing can;
   (b) a dip tube attached to said body and spout unit, said tube communicating with said liquid passage;
   (c) handle means for controlling the flow of liquid through said valve body and spout unit, said handle means being pivotally attached to said body and spout unit;
   (d) gas cartridge receiving means in said handle for receiving a gas-containing cartridge;
   (e) means defining a high pressure chamber communicating with said cartridge-receiving means;
   (f) means defining a low pressure chamber communicating with said gas passage;
   (g) Connecting passage means for connecting said high pressure chamber to said low pressure chamber;
   (h) regulator means for regulating the pressure in said low pressure chamber and keeping said pressure constant;
   (i) stiff but resilient clamp means for removably holding said body and spout unit in contact with a can over an opening therein, and (j) seal means for forming a gas and liquid-tight seal between said valve body and spout unit and said can when said clamp is in position of use over a can.

3. A combination container pressurizing and liquid dispensing device as defined in claim 2 in which said regulator means comprises an unbalanced valve, piston operated regulator.

4. A combination container pressurizing and liquid dispensing device as defined in claim 2 in which said regulator means includes a movable piston located in said low pressure chamber, said piston being responsive to the pressure therein, a valve in said connecting passage between said chambers, said valve being operatively connected to said piston, whereby the pressure in said low pressure chamber is automatically maintained at a preset level.

5. A combination container pressurizing and liquid dispensing device as defined in claim 2 in which said regulator means include a movable piston located in said low pressure chamber, said piston being responsive to the pressure therein, a pressure control valve fixedly attached to said piston and extending into said high pressure chamber through said connecting passage, whereby said valve operates to regulate the pressure in said low pressure chamber.

6. A combination container pressurizing and liquid dispensing device as defined in claim 2 in which said clamp means is in the form of a spring steel clamp.

7. A combination container pressurizing and liquid dispensing device as defined in claim 3 in which said piston is a plastic piston.

References Cited by the Examiner

UNITED STATES PATENTS

| | | | |
|---|---|---|---|
| 2,740,666 | 4/1956 | Boulay | 222—89 X |
| 3,197,144 | 7/1965 | Kochner | 222—399 X |

ROBERT B. REEVES, *Primary Examiner.*

N. L. STACK, *Assistant Examiner.*